April 8, 1930.  A. F. BREITENSTEIN  1,753,819
SELF OPENING DIE HEAD
Filed Sept. 16, 1926  2 Sheets-Sheet 1
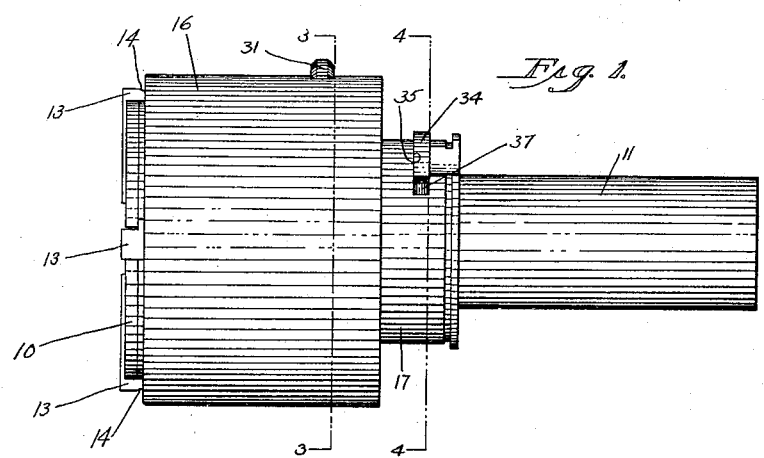
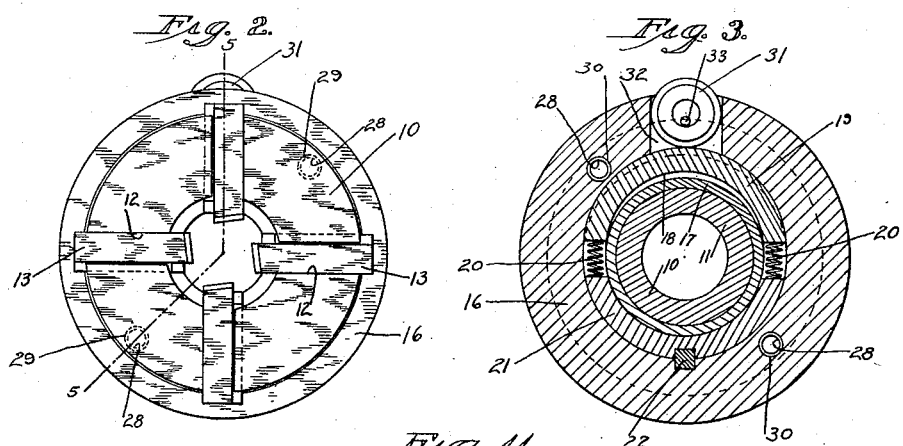
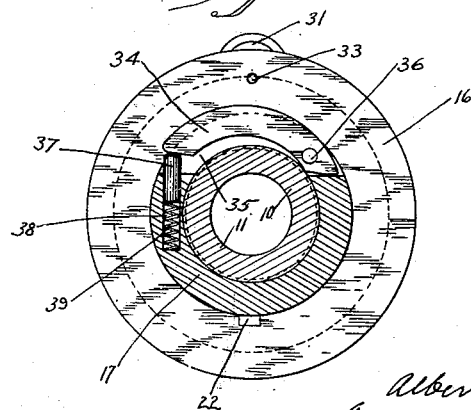
Inventor.
Albert F. Breitenstein
by Seymour Pearce & Nichols
Attys

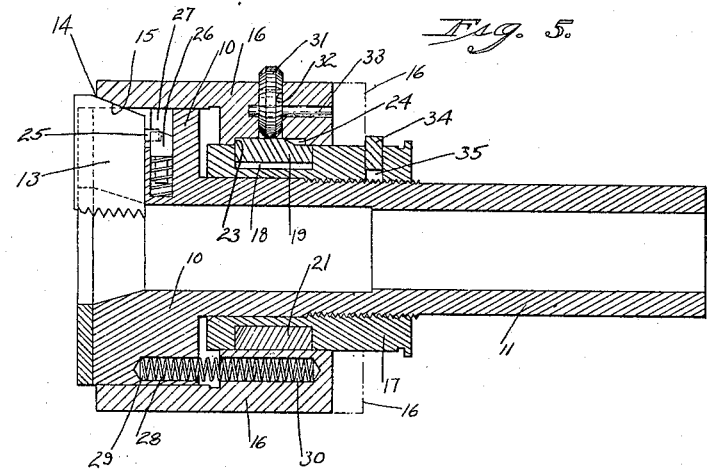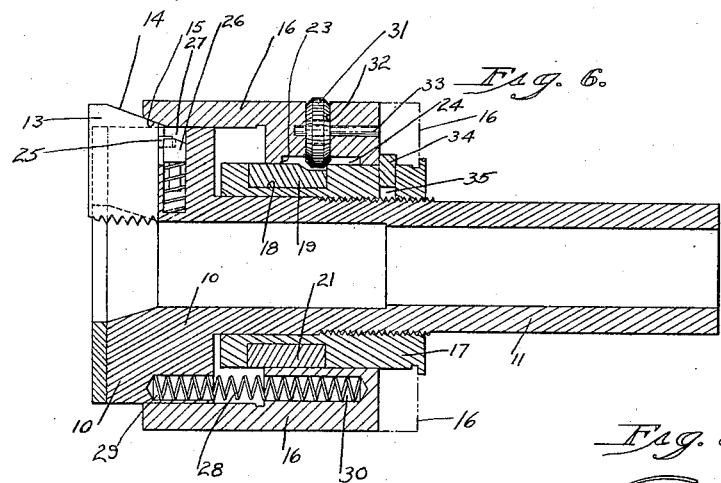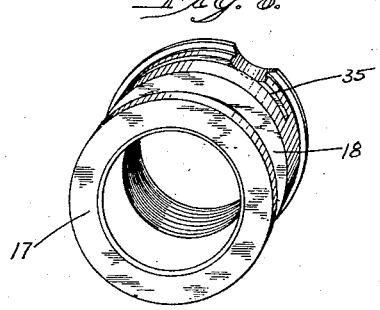

Patented Apr. 8, 1930

1,753,819

UNITED STATES PATENT OFFICE

ALBERT F. BREITENSTEIN, OF NEW HAVEN, CONNECTICUT, ASSIGNOR TO THE GEOMETRIC TOOL COMPANY, OF NEW HAVEN, CONNECTICUT, A CORPORATION

SELF-OPENING DIE HEAD

Application filed September 16, 1926. Serial No. 135,755.

My invention relates to an improvement in self-opening die-heads of the class in which the chaser-operating member has three positions,—namely, a chaser-closing position, a chaser-retracted position, and a chaser-clearance position, the object of my present invention being to provide simple, reliable, durable, readily accessible, releasable means for checking the chaser-operating member in its chaser-retracted position and releasable to permit the same to move therefrom into its chaser-clearance position.

With these ends in view, my invention consists in a self-opening die-head of the character described, having a body, chasers carried thereby, a chaser-operating member having axial movement with respect to the said body, an adjusting-nut mounted upon the body for varying the diameter of the cutting action of the chasers, and a spring-pressed stop-member mounted in the said nut in position to co-act with the chaser-operating member in the chaser-retracted position thereof and releasable to permit it to move into its chaser-clearance position.

My invention further consists in a die-head characterized as above and having certain details of construction and combinations of parts as will be hereinafter described and pointed out in the claims.

In the accompanying drawings:

Fig. 1 is a view in side elevation of a self-opening die-head embodying my invention;

Fig. 2 is a view thereof in front elevation;

Fig. 3 is a view thereof in transverse section on the line 3—3 of Fig. 1;

Fig. 4 is a corresponding view on the line 4—4 of Fig. 1;

Fig. 5 is a view in longitudinal section on the line 5—5 of Fig. 2, the die-head being shown as in its closed or cutting position;

Fig. 6 is a corresponding view of the die-head shown in its chaser-retracted position, with the chaser-clearance position of its operating-sleeve indicated by broken lines;

Fig. 7 is a detached perspective view of the stop-member; and

Fig. 8 is a detached perspective view of the adjusting-nut.

For the purpose of illustration, I have shown my invention as embodied in a standard form of self-opening die-head having a skeletonized body 10 provided at its rear end with an integral tubular shank 11 and formed at its forward end with four radial slots 12 receiving a corresponding number of radially-movable chasers 13, the inner ends of which are formed with cutting-teeth and the outer ends of which are beveled as at 14 for co-action with bevels 15 in the forward end of a chaser-operating sleeve 16 having axial movement upon the body 10 aforesaid. An internally-threaded adjusting-nut 17, mounted upon the threaded portion of the body 10, bears at its forward end upon the rear end of the sleeve 16 and predetermines the axial forward movement thereof. At its forward end the said adjusting-nut 17 is formed with an external annular groove 18 receiving a locking-segment 19, constantly urged to move into its outward or locking position by helical springs 20 located in the said groove, engaging its respective ends and resting upon the ends of a filler-segment 21 located in the opposite half of the groove and prevented from endwise movement therein by a key 22 in the sleeve 16. The springs 20 exert a constant effort to move the locking-segment outwardly as aforesaid for the engagement of its outer forward corner with the forward wall 23 of an eccentric groove 24 in the internal periphery of the rear end of the chaser-operating sleeve 16. By turning the said adjusting-nut 17 in one direction or the other, the relation of its locking-segment 19, with respect to the forward wall 23 of the eccentric groove 24, will be changed as is required to vary the effective cutting diameter of the chasers 13.

For moving the said chasers into their retracted positions, they are provided near their outer ends with inwardly-projecting pins 25 engaged by spring-pressed plungers 26 located in radial holes 27 formed in the body 10 directly back of the respective grooves 12 therein. Two operating-springs 28 having their forward ends inserted into bores 29 in the body 10 and their rear ends inserted into bores 30 in the sleeve 16, exert a constant effort to force the sleeve rearwardly with respect to the body.

For tripping the die-head at the conclusion of the cutting operation, I employ a roller 31 located in a radial slot 32 in the rear portion of the sleeve 16 and retained therein by a pin 33 smaller in diameter than the internal diameter of the roller, so as to permit it to have limited radial movement. Normally, the outer edge of the said roller 31 projects beyond the periphery of the sleeve 16 into position to be engaged by an abutment carried by the machine in which the die-head is being used, the said roller 31 being of such diameter that when its projecting edge is struck by the abutment referred to, it will be forced inwardly with the effect of correspondingly moving the locking-segment 19 against the tension of its springs 20, thus disengaging the forward edge of the segment from the forward wall 23 of the eccentric groove 24, thereby permittng the springs 28 to move the sleeve 16 from front to rear, the chasers 14 being concurrently moved by their spring-actuated plungers 26 into their retracted positions.

Coming now to my present invention:

To provide for checking the rearward movement of the sleeve 16 when it reaches its intermediate or chaser-retracted position, I employ a stop-member, herein shown as a segment 34, located in a peripheral segmental slot 35 in the rear end of the adjusting-nut 17 and hung at one end upon a pin 36 in the said slot. The said stop is normally held outward in its checking position by the engagement of its free end with a plunger 37 located in a bore 38 in the nut, the said bore also receiving a plunger-operating spring 39. In its projected or operating position, the forward face of the stop is engaged by the rear end of the sleeve 16, as shown in Fig. 6.

When it is desired to remove the chasers 13 from the die-head, the stop 34 is manually pushed inward to clear its forward face from the rear end of the sleeve 16, which is then moved by the springs 28 into its chaser-clearance position, in which its forward end is entirely clear of the chasers, which then may be manually removed from the die-head. It will be seen from the foregoing description that the sleeve 16 has three positions,—namely, a forward or chaser-closing, an intermediate or chaser-retracted position, and a rearward or chaser-clearance position.

In my pending application, filed November 23, 1925, Serial No. 70,949, now Patent No. 1,683,126, dated September 4, 1928, in which I have shown and described a self-opening die-head of a type similar to that herein shown and described, I disclosed a double-ended pivotally-mounted manually-operable stop-member discharging a function corresponding to the stop-member 34 herein described but mounted in the operating-sleeve, rather than in the adjusting-nut, as herein shown and provided for.

The stop-member of my prior application, on account of its location in the operating-sleeve, precludes the employment of a tripping sleeve, and, in addition to that, is located in a much more exposed position, with attendant disadvantages, than in my present application, in which the stop-member, being located in the adjusting-nut, is protected by being situated within the largest diameter of the die-head and, moreover, in a position in which it is very readily accessible for manual operation. Furthermore, my improved stop-member presents a long impact-receiving face, whereas, the corresponding member of my pending application has its impact-receiving face limited to a relatively small finger located at one of its ends, and on that account much more liable to be deformed in use, and ultimately caused to cramp or jam, than the stop-member of my present device, with its relatively-long impact-receiving face.

I claim:

1. A self-opening die-head having a body, radially-movable chasers, a chaser-operating member having chaser-closing, chaser-retracted, and chaser-clearance positions, a locking-member therefor, an adjusting-nut threaded upon the said body and provided with a peripheral slot, an inwardly-yielding stop-member located in the said slot and normally projecting therefrom beyond the periphery of the said adjusting-nut for engagement by the said operating-member to stop the same in its chaser-retracted position and shaped and proportioned to be manually pressed inward below the periphery of the said adjusting-nut to release the said member to permit it to move into its chaser-clearance position, and spring means for yieldingly urging the said stop-member into its projected position.

2. A self-opening die-head having a body, radially-movable chasers, a chaser-operating sleeve having chaser-closing, chaser-retracted, and chaser-clearance positions, a locking-member therefor, an adjusting-nut threaded upon the said body and provided with a peripheral slot, a segmental stop-member pivotally mounted at one end in the said slot and normally projecting beyond the periphery of the said adjusting-nut for engagement by the operating-member to stop the same in its chaser-retracted position and shaped and proportioned to be manually pressed inward below the periphery of the said adjusting-nut to release the same to permit it to move into its chaser-clearance position, and a spring-means carried by the said nut and constantly urging the said stop-member into its normally-projected position.

In testimony whereof, I have signed this specification.

ALBERT F. BREITENSTEIN.